(12) United States Patent
Crawford et al.

(10) Patent No.: US 12,055,767 B2
(45) Date of Patent: Aug. 6, 2024

(54) PUSHABLE OPTICAL CONNECTOR WITH CONNECTOR-INTEGRATED ARTICULATION

(71) Applicant: PPC BROADBAND, INC., East Syracuse, NY (US)

(72) Inventors: William L. Crawford, Syracuse, NY (US); Noah P. Montena, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 18/112,332

(22) Filed: Feb. 21, 2023

(65) Prior Publication Data
US 2023/0194793 A1 Jun. 22, 2023

Related U.S. Application Data

(63) Continuation of application No. 16/878,494, filed on May 19, 2020, now Pat. No. 11,585,987, which is a continuation of application No. 15/978,014, filed on May 11, 2018, now Pat. No. 10,656,345.

(60) Provisional application No. 62/505,109, filed on May 11, 2017.

(51) Int. Cl.
*G02B 6/38* (2006.01)

(52) U.S. Cl.
CPC ......... *G02B 6/3825* (2013.01); *G02B 6/3821* (2013.01); *G02B 6/3887* (2013.01); *G02B 6/3893* (2013.01)

(58) Field of Classification Search
CPC .. G02B 6/3821; G02B 6/3831; G02B 6/3851; G02B 6/3863; G02B 6/3869; G02B 6/387; G02B 6/3871; G02B 6/3874; G02B 6/3887; G02B 6/3893; G02B 6/3897; G02B 6/46
See application file for complete search history.

(56) References Cited

U.S. PATENT DOCUMENTS

2018/0217335 A1* 8/2018 Leeson ................ G02B 6/3833

* cited by examiner

*Primary Examiner* — Michael P Mooney
(74) *Attorney, Agent, or Firm* — MH2 TECHNOLOGY LAW GROUP LLP

(57) ABSTRACT

An optical fiber connector sub-assembly for an optical fiber connector includes a ferrule configured to hold an optical fiber therein along an axis of the ferrule and a ferrule holder configured to hold the ferrule. The ferrule has an end face at which the optical fiber is terminated, and the ferrule holder includes a base in which the ferrule is configured to be seated. The sub-assembly includes a ferrule basket including an inner sleeve slidably coupled with an outer sleeve and configured to isolate a front end of the connector from a rear end of the connector such that the ferrule is isolated from movement of the rear end of the connector. The ferrule basket is configured to receive the ferrule holder therein.

23 Claims, 11 Drawing Sheets

PUSHABLE OPTICAL CONNECTOR WITH CONNECTOR-INTEGRATED ARTICULATION

CROSS-REFERENCE TO RELATED APPLICATIONS

This is a continuation of U.S. application Ser. No. 16/878,494, filed May 19, 2020, pending, which is a continuation of U.S. application Ser. No. 15/978,014, filed May 11, 2018, now U.S. Pat. No. 10,656,345, which claims the benefit of U.S. Provisional Application No. 62/505,109, filed May 11, 2017. The disclosure of the prior applications is hereby incorporated by reference herein in its entirety.

BACKGROUND

The present disclosure relates to an optical fiber connector, for example an SC-type or LC-type connector, and, more particularly, to a pushable optical connector with connector-integrated articulation.

The mechanical tolerances involved in terminating single mode optical fiber are much tighter than those for multimode optical fiber. Therefore, while it is quite common for multimode optical fiber be terminated at the point of use, for example, at a user's premises or at an outside junction box, in most product applications, single mode optical fiber is not terminated in the field. When single mode fiber must be terminated in the field, then it can take a skilled technician between about 15 to 20 minutes to splice fibers together either by using a V-groove clamp or expensive fusion welding equipment.

Single mode fiber is therefore often provided in a range of different lengths, pre-terminated at both ends with a connector plug ready to plug into a matching receptacle. Commonly, eight or twelve single mode optical fibers may be bundled together in an optical fiber cable having an outer protective tube inside of which the optical fibers run.

An example of such a connector is the "Subscriber Connector," or SC connector, originally developed by NTT®. SC connectors have convenient push/pull style mating, and are approximately square in cross-section and with a 2.5 mm diameter ferrule at the termination of the optical fiber, surrounded by a plastic housing for protection. SC connectors are available in single or duplex configurations. The SC connector latches into a matching socket in a simple push motion. The push-pull design includes a spring against which the ferrule slides within a plastic inner housing. This arrangement provides a reliable contact pressure at the ferrule end and resists fiber end face contact damage of the optical fiber during connection. The connector can be quickly disconnected by first pulling back an outer housing, which is slidable relative to the inner housing, to disengage a latch inside socket between the socket and the inner housing, before pulling the optical fiber connector from the socket. Until the latch is thus disengaged, the latch prevents withdrawal of the connector when the optical fiber cable is pulled in a direction away from the socket.

A different type of optical fiber connector is the ST type connector, which has a key that prevents rotation of the ceramic ferrule and which connects with a socket using a bayonet lock with an outer shell. All such bayonet type optical fiber connectors are referred to herein for convenience as "ST-type" optical fiber connectors.

An advantage of the SC connector over this type of bayonet connector is that the connector sockets can be more closely packed, as there is no need to get fingers fully around the connector to disengage the connector from the socket.

Other examples of push/pull type connectors are LC (Lucent Connector) connectors or MU connectors. Often, the fiber-end is angled to reduce back reflections and this is usually described by adding APC (Angled Physical Contact) to the name. All such push/pull type optical fiber connectors are for convenience referred to herein as "SC-type" optical fiber connectors. SC-type LC or MU connectors are also known as small form factor connectors, by virtue of having a 1.5 mm diameter ferrule and a plastic housing.

It is important to avoid bending optical fiber around curves having too sharp a bend radius, as this will increase optical losses and can permanently damage the optical fiber. Optical fiber cables are therefore often routed inside a protective outer tube or conduit, which can have minimum bend-limiting properties. Protective bend limiting conduits normally have an outer diameter of 8 mm or 10 mm tubes. The cross-section of a standard SC connector has dimensions of about 7 mm×9 mm, and even a small form factor SC connector is too large to fit inside the inner diameter of a typical protective conduit.

Conventional optical fiber connectors comprise a rigid pushable structure to allow for limited movement of the connector parts while being pushed down stretches of duct. However, due to their rigid structure, conventional optical fiber connectors suffer from signal degradation when weight is added to the cable and the connector while the connector is transmitting a signal.

It may be desirable to provide an optical fiber connector with improved signal transmission capability. As such, it may be desirable to provide an optical fiber connector with a structure that isolates the front end of the connector from the rear end of the connector such that the ferrule is isolated from movement when the rear end of the connector bends due to weight being added to the rear end.

SUMMARY

In accordance with various aspects of the disclosure, an optical fiber connector sub-assembly for an optical fiber connector includes a ferrule configured to hold an optical fiber therein along an axis of the ferrule and a ferrule holder configured to hold the ferrule. The ferrule has an end face at which the optical fiber is terminated, and the ferrule holder includes a base in which the ferrule is configured to be seated. The sub-assembly includes a ferrule basket including an inner sleeve slidably coupled with an outer sleeve and configured to isolate a front end of the connector from a rear end of the connector such that the ferrule is isolated from movement of the rear end of the connector. The ferrule basket is configured to receive the ferrule holder therein.

In some aspects, the inner sleeve and the outer sleeve are configured to articulate relative to one another.

According to various aspects, the inner sleeve may include a cylindrical portion and two fingers extending from a forward end of the cylindrical portion, and the outer sleeve may include two slots extending in an axial direction of the outer sleeve. In some aspects, each of the two fingers includes a tab extending radially outward from the forward end of the fingers, the tabs and the two slots being structured and arranged relative to one another such that the tabs are configured to snap into the slots. In various aspects, the tabs and the slots are disposed symmetrically on the inner sleeve and the outer sleeve, respectively.

According to some aspects, the tabs are configured to bend radially inward when being inserted into the slots and to return toward an unstressed configuration after being inserted into the slots. In various aspects, after the tabs are inserted into the slots, the inner sleeve is configured to articulate relative to the outer sleeve in an X-axis direction and a Y-axis direction that are perpendicular to each other and to an optical fiber axis.

In some aspects, the ferrule holder and the inner sleeve are relatively moveable with respect to each other along the ferrule axis between limits defined by an interaction between the inner sleeve and the outer sleeve, and a portion of the ferrule leading to the end face of the ferrule projects along the ferrule axis away from the inner sleeve. Various aspects may include a spring provided between the ferrule holder and the inner sleeve and configured such that the projecting portion of the ferrule is spring-biased along the ferrule axis away from the inner sleeve.

In accordance with various aspects, the ferrule holder and outer sleeve are adapted to be assembled by a press-fitting operation in which the ferrule holder moves along the ferrule axis into a receiving portion of the ferrule basket.

According to some aspects, the optical fiber includes a length of optical fiber extending away from the ferrule, the ferrule holder and the ferrule basket, the length is surrounded by a material for protection and/or reinforcement, and the ferrule basket includes means for attaching cladding to said material.

In various aspects, a spring is provided between the ferrule holder and the ferrule basket and configured such that the projecting portion of the ferrule is spring-biased along the ferrule axis away from the ferrule holder carrier.

The optical fiber connector sub-assembly may be suitable for inclusion in any type of optical fiber connection, for example, an ST-type optical fiber connector. In preferred embodiments of the invention the optical fiber connector sub-assembly is for an SC-type optical fiber connector or an LC-type optical fiber connector.

The optical fiber will normally lead to the ferrule through the stem.

The spring may be provided between the ferrule holder and the inner sleeve. The spring may be a coil spring that is concentrically seated around the stem of the ferrule holder.

The ferrule holder and ferrule basket may be adapted to be assembled by a press-fitting operation in which the ferrule holder moves along the ferrule axis into the receiving portion of the ferrule holder.

The optical fiber will usually include a length of optical fiber extending away from the ferrule, the ferrule holder and the ferrule basket. This length can be surrounded by a material for protection and/or reinforcement, in which case the ferrule holder carrier advantageously includes means for attaching said cladding to this material.

According to various aspects of the disclosure, a Subscriber Connection (SC)-type optical fiber connector may include an optical fiber connector sub-assembly, an inner housing, and an outer housing, the connector sub-assembly being according to the disclosure, wherein: the inner housing is fixedly connected to the ferrule basket, the inner housing includes a portion which coaxially extends around said projecting portion of the ferrule to define a receptacle for a socket to receive the projecting ferrule portion; the spring biasing means is provided between the ferrule holder and the ferrule basket so that the projecting portion of the ferrule is spring biased along the ferrule axis towards the receptacle portion of the inner housing; and the inner housing is engaged within the outer housing, the inner housing and the outer housing being relatively moveable with respect to each other along the ferrule axis between limits defined by an interaction between the inner housing and the outer housing in order to provide SC-style push/pull engagement/disengagement with a mating optical fiber socket.

The ferrule housing assembly serves as an inner housing in relation to the outer housing in the provision of the SC-style push/pull engagement/disengagement.

The ferrule is preferably rotationally fixed with respect to the ferrule holder about the ferrule axis, with the ferrule holder bring rotationally aligned by means of one or more rotational keys with respect to the outer housing so that the rotational orientation of the ferrule with respect to the outer housing can be set during assembly of the connector at one of one or more predefined rotational orientations.

A first rotational key may be provided between the ferrule holder and the ferrule basket. A second rotational key may then be provided between the ferrule basket and the inner housing. The ferrule holder and the ferrule basket may have aligned features which provide a combined rotational key between, on the one hand, the ferrule holder and the ferrule basket, and, on the other hand, the inner housing.

A further rotational key may be provided between the ferrule holder sub-assembly and the outer housing.

The ferrule holder and ferrule basket may be adapted to be assembled by a press-fitting operation in which the ferrule holder moves along the ferrule axis into the receiving portion of the ferrule holder.

The inner housing is adapted to be assembled to the ferrule holder and the ferrule basket by a press-fitting operation in which the inner housing moves along the ferrule axis over the projection portion of the ferrule towards the ferrule basket.

According to various aspects of the disclosure, a Lucent Connection (LC)-type optical fiber connector may include an optical fiber connector sub-assembly and a housing, the connector sub-assembly being according to the disclosure, wherein: the housing is fixedly connected to the ferrule basket, the housing includes a portion which coaxially extends around said projecting portion of the ferrule to define a receptacle for a socket to receive the projecting ferrule portion; the spring biasing means is provided between the ferrule holder and the ferrule basket so that the projecting portion of the ferrule is spring biased along the ferrule axis towards the receptacle portion of the housing; and the housing being configured to provide LC-style push/pull engagement/disengagement with a mating optical fiber socket.

The ferrule housing assembly serves as a housing in relation to the housing in the provision of the LC-style push/pull engagement/disengagement.

The ferrule is preferably rotationally fixed with respect to the ferrule holder about the ferrule axis, with the ferrule holder bring rotationally aligned by means of one or more rotational keys with respect to the housing so that the rotational orientation of the ferrule with respect to the housing can be set during assembly of the connector at one of one or more predefined rotational orientations.

A first rotational key may be provided between the ferrule holder and the ferrule basket. A second rotational key may then be provided between the ferrule basket and the housing. The ferrule holder and the ferrule basket may have aligned features which provide a combined rotational key between, on the one hand, the ferrule holder and the ferrule basket, and, on the other hand, the housing.

A further rotational key may be provided between the ferrule holder sub-assembly and the housing.

The ferrule holder and ferrule basket may be adapted to be assembled by a press-fitting operation in which the ferrule holder moves along the ferrule axis into the receiving portion of the ferrule holder.

The housing is adapted to be assembled to the ferrule holder and the ferrule basket by a press-fitting operation in which the housing moves along the ferrule axis over the projection portion of the ferrule towards the ferrule basket.

BRIEF DESCRIPTION OF THE DRAWINGS

Embodiments of the invention will now be further described, by way of example only, and with reference to the accompanying drawings, in which.

DETAILED DESCRIPTION OF EMBODIMENTS

Figure 1:
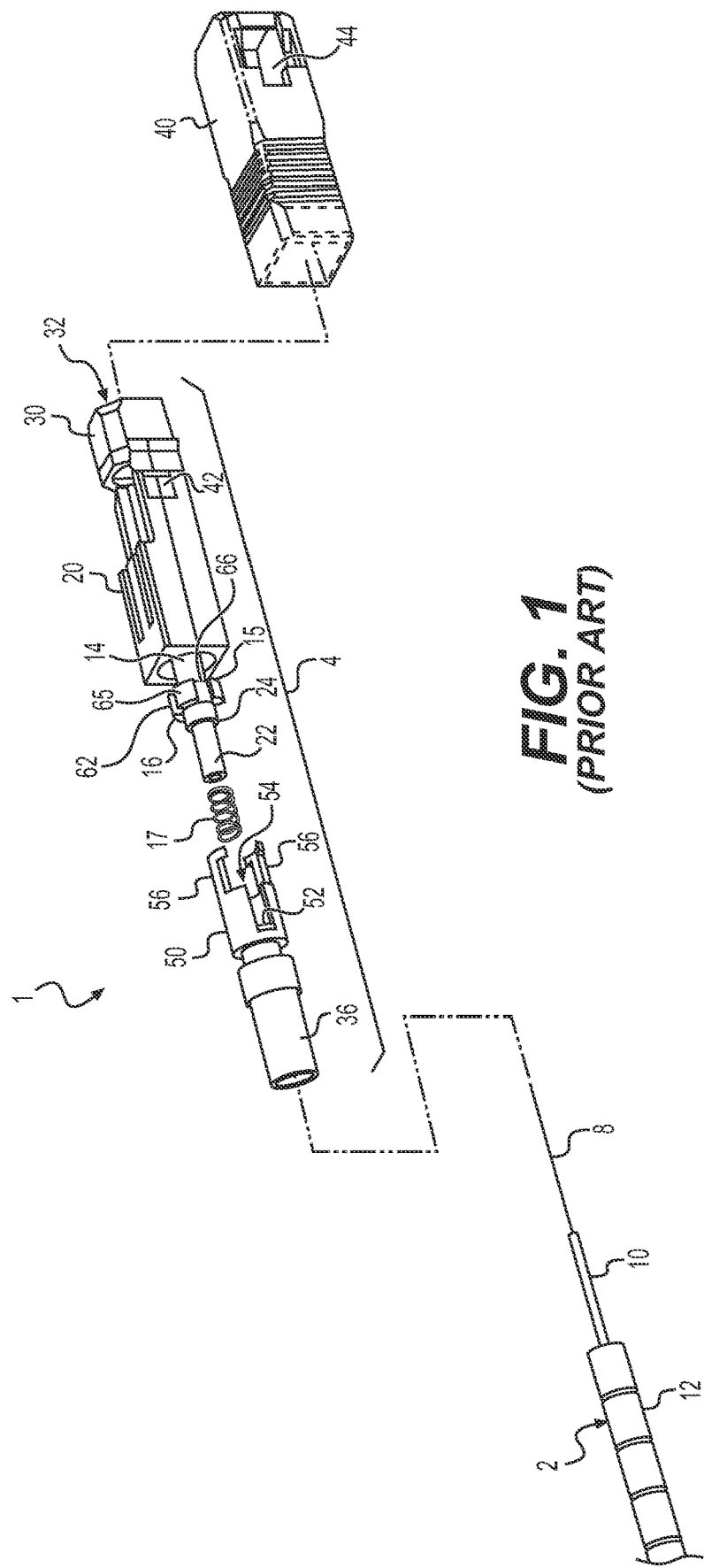
FIG. 1 is an exploded perspective view of an exemplary prior art SC connector.
Figure 2:
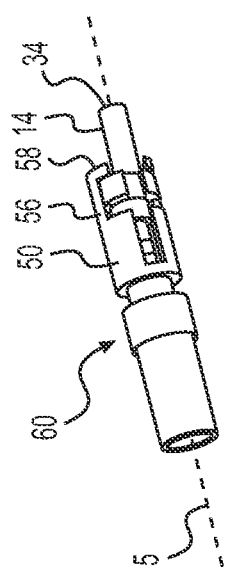
FIG. 2 is a perspective view of the optical fiber connector sub-assembly of FIG. 1 when assembled.
Figure 3:
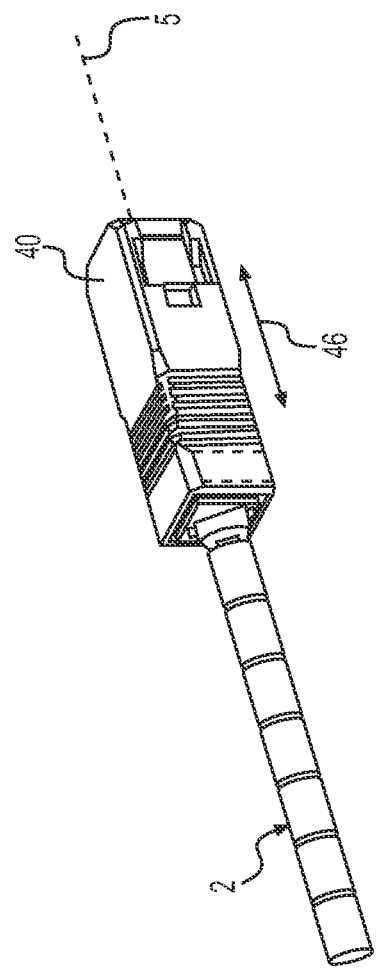
FIG. 3 is a perspective view of the SC connector of FIG. 1 when assembled.
Figure 4:
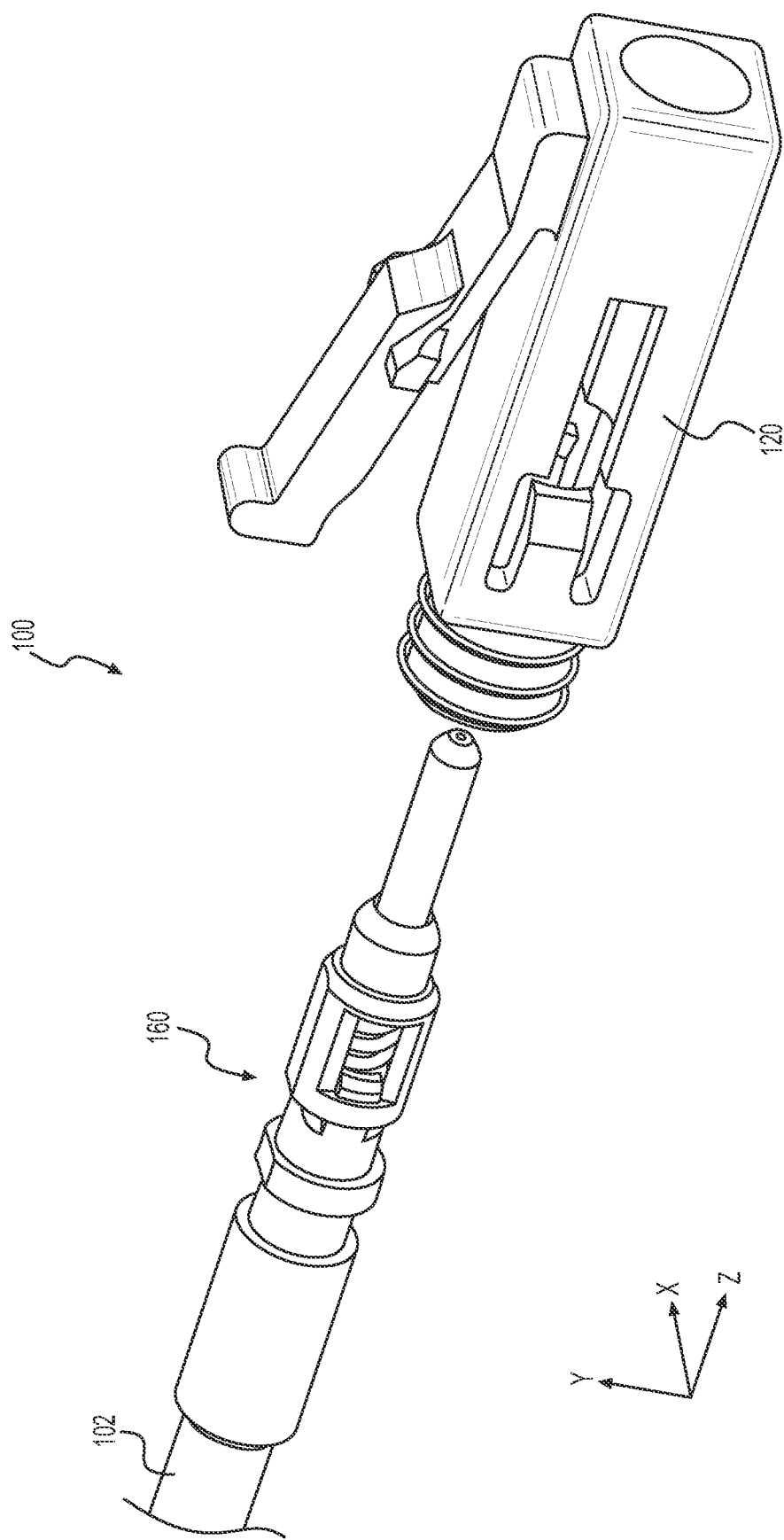
FIG. 4 is an exploded perspective view of an exemplary LC connector in accordance with various aspects of the disclosure.
Figure 5:
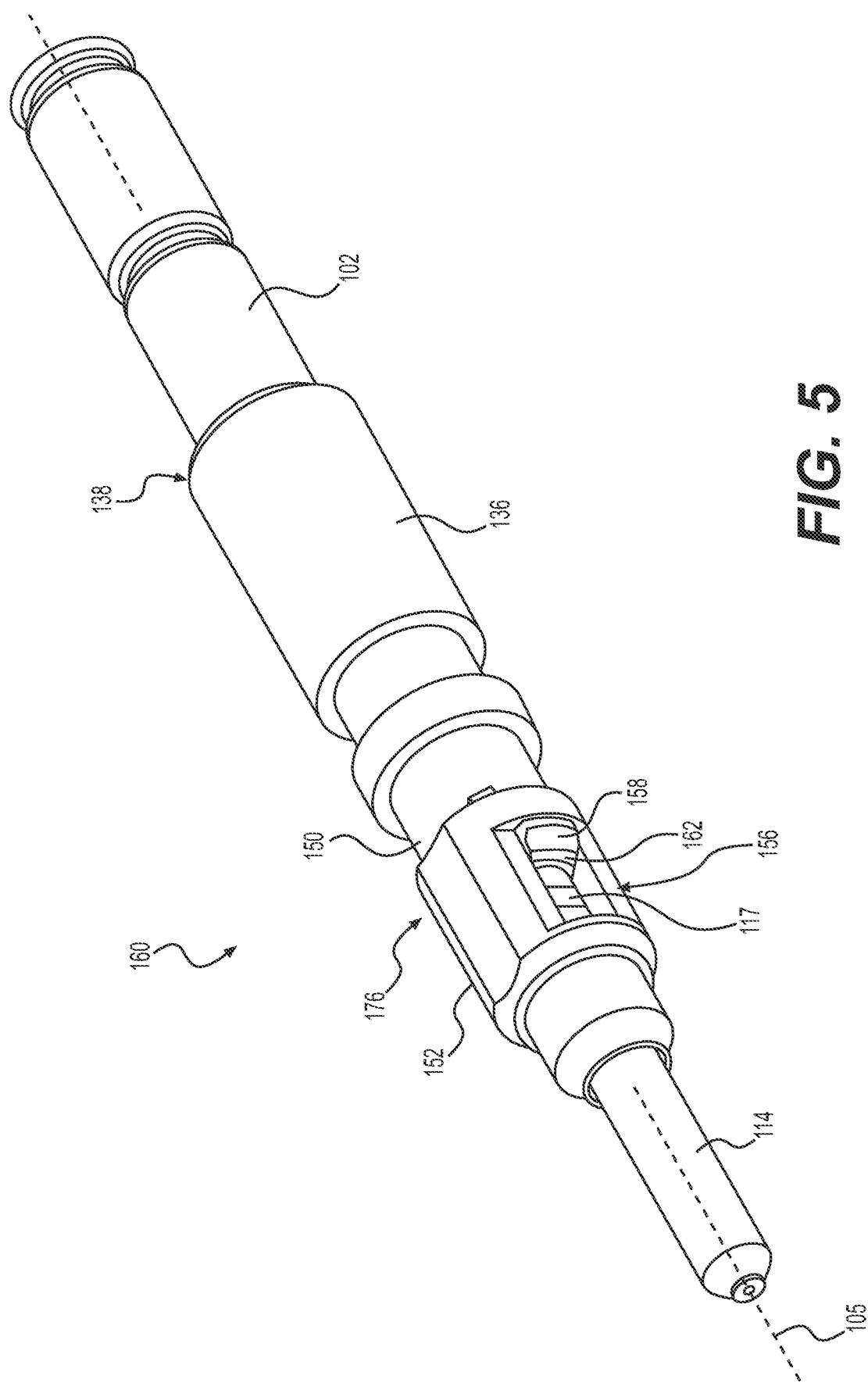
FIG. 5 is a perspective view of the optical fiber connector sub-assembly of the exemplary LC connector of FIG. 4.

FIGS. 1 to 3 show an exemplary prior art SC connector, such as the connector disclosed in U.S. Pat. No. 8,439,577, the disclosure of which is incorporated herein by reference. The exemplary SC connector 1 comprises an optical fiber cable 2, a ferrule housing sub-assembly 4 (which includes an optical fiber connector sub-assembly 60), and an outer housing 40 to provide SC-style push/pull engagement/disengagement with a mating optical fiber socket (not shown).

The cable 2 holds a single strand of 125 μm diameter single mode optical fiber 8, protected by primary and secondary buffering layers 10, about 900 μm in diameter and an outer sheath 12, typically 3 mm to 5 mm in diameter. The optical fiber 8 is terminated by the ferrule in a manner well-known to those skilled in the art, and defines a ferrule axis 5 which extends centrally through the SC connector 1.

The ferrule housing sub-assembly 4 includes a cylindrical ceramic ferrule 14, a ferrule holder 16 in which the ferrule is seated, a helical spring 17, a ferrule holder carrier 50, and an inner housing 20. The ferrule holder 16 has a cylindrical stem 22 which extends in an axial direction away from the ferrule 14 towards a sleeve 136 of the ferrule holder carrier 50 used to make a crimp connection around the optical fiber cable sheathing 12. The spring 17 is seated around the stem 22 between an annular shoulder 24 on the ferrule holder 16 and a similar annular surface 52 within a cylindrical recess 54 of the ferrule holder carrier 50. The stem 20 is slidably seated in a closely fitting bore of the ferrule holder carrier 50.

During assembly, the ferrule holder 16 and seated ferrule 14 are inserted axially into the recess 54 of the ferule holder carrier 50. The carrier 50 has a pair of arms 56 around a portion of the stem 22 nearest the ferrule 14 which extend axially forwards of the stem on opposite sides of the base 15 of the ferrule holder. Two pairs of curved fingers 58 are provided, each pair extending in opposite circumferential directions at the end of each arm 56. The fingers 58 extend transversely to the length of the arms 56 partially around the circumference of a portion of the ferrule nearest the base 15.

The ferrule base 15 has four cycles of crenellations 62 spaced symmetrically around the circumference of the base and which provide four corresponding channels that extend parallel to the optical fiber axis 5. These crenellations are in the form of alternating radially high 65 and low 66 cylindrically shaped regions with the circumferential and axial extent of each of the high and low regions being the same. The high and low regions are separated by steps 67 that extend in a radial direction. The arms 56 are seated in opposite radially low regions 66 in a sliding fit with the adjacent high regions 65, and reach axially forward of the base 15 and crenellations 62 so that the fingers 58 engage with the intervening radially high regions 65 on a side 61 of the base 15 opposite the annular surface 24 against which the spring 17 is engaged.

The aforementioned arrangement permits a degree axial movement of the ferrule holder 50, with movement being therefore limited in one direction by the compression of the spring 17 between the two annular surfaces 24, 52 and in the other axial direction by the contact of the fingers 58 with the radially high regions 65 of the crenellations 62 on the base 15 of the ferrule holder 16. As can be seen from the drawings, the ferrule holder base 15 and ferrule holder carrier 50 also have a common cylindrical outer envelope.

The inner housing 20 has a forward portion 30 that coaxially extends around the axially projecting ferrule 14 to define a receptacle 32 for a socket (not shown) to receive a projecting portion of the ferrule 14.

The ferrule holder 16 is free to move backwards inside the ferrule holder carrier 50 and the inner housing 20 when an end face 34 of the ferrule 14 comes into contact with a similar end face (not shown) of another optical fiber ferrule when making an optical connection.

The ferrule holder carrier 50 has a central aperture (not shown) through which the optical fiber 8 and buffering 10 pass, and has in a rear-most portion a sleeve 36 sized to receive and be crimped to the cable sheathing 12. In some aspects, a strain-relief sleeve 38, or boot, may be provided around the junction of the optical fiber cable 2 and the ferrule housing sub-assembly 4.

An outer housing 40 is press-fitted axially over the assembled ferrule housing sub-assembly 4. Once the inner housing 20 and outer housing 40 are engaged together, the inner and outer housings are relatively moveable with respect to each other along the ferrule axis 5 between limits defined by an interaction between the inner housing 20 and the outer housing 40 provided by projections 42 on a pair of opposite sides of the inner housing 20 and a pair of apertures 44 in the outer housing. The projections 42 and apertures 44 interact with sprung features inside a matching socket (not shown) to provide SC-style push/pull 46 engagement/disengagement configured to mate with an optical fiber socket.

FIGS. 4-8 illustrate an exemplary LC connector 100 including an optical fiber connector sub-assembly 160 and a conventional housing 120 that provides LC-style push/pull engagement/disengagement with a mating optical fiber socket (not shown). The housing 120 is connected with the optical fiber connector sub-assembly 160 in a manner known to persons skilled in the art. The LC connector 100 is configured to be coupled with an optical fiber cable 102, which holds an optical fiber 8, for example, a single strand of 125 μm diameter single mode optical fiber, protected by primary and secondary buffering layers 10, about 900 μm in diameter, and an outer sheath 12, typically 3 mm to 5 mm in diameter.

The optical fiber connector sub-assembly 160 includes a cylindrical ceramic ferrule 114, a ferrule holder 116 in which the ferrule 114 is seated, a helical spring 117, and a two-part ferrule basket 176. The optical fiber 108 is terminated by the ferrule in a manner well-known to those skilled in the art, and defines a ferrule axis 105 that extends centrally through the LC connector 100. The ferrule basket 176 includes an inner sleeve 150 and an outer sleeve 152. The inner sleeve 150 and the outer sleeve 152 are coupled to one another and slidable relative to one another along the ferrule axis 105 of the optical fiber connector sub-assembly 160.

Figure 6:
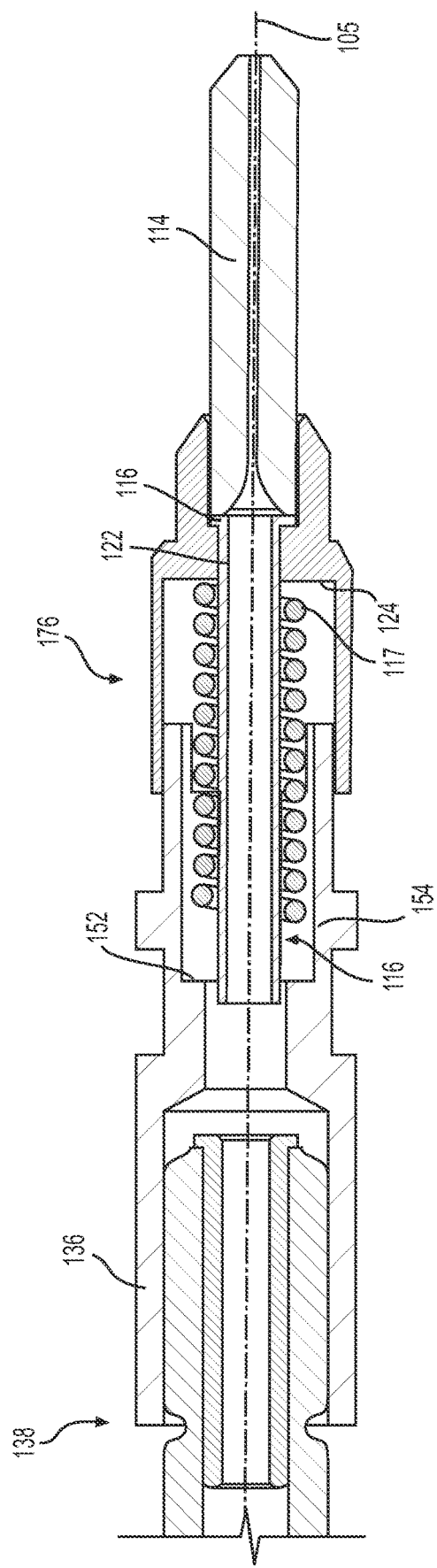
FIG. 6 is an side cross-sectional view of the optical fiber connector sub-assembly of FIG. 5.
Figure 7:
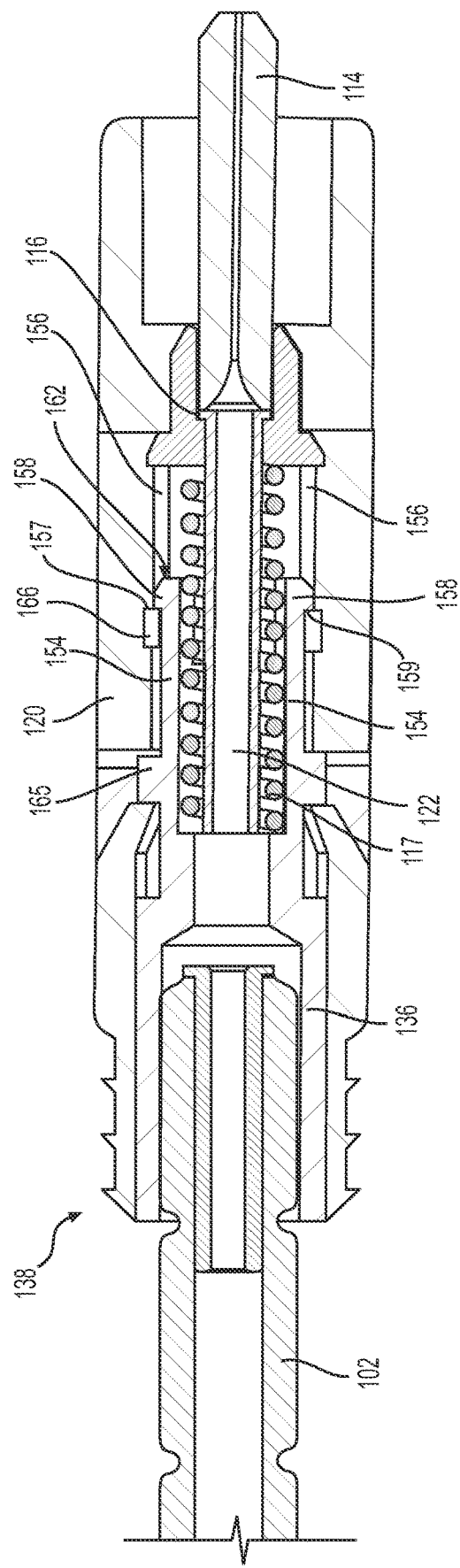
FIG. 7 is an top cross-sectional view of the LC connector of FIG. 4.

Further, the inner sleeve 150 and the outer sleeve 152 are coupled to one another to permit articulation relative to one another, as described hereinbelow. Referring to FIG. 6, the inner sleeve 150 includes a plurality of fingers 154 formed on the inner sleeve and extending in the longitudinal direction. The fingers 154 are arranged diametrically opposite to one another and are resilient to allow inward and outward flexion in a radial direction relative to the ferrule axis 105. Although the illustrated embodiment includes two fingers 154, it should be appreciated that three or more fingers can be provided. Each of the fingers 154 includes a tab 158 that extends radially outward from a forward end 162 of the respective finger 154.

The outer sleeve 152 includes two slots 156 that are arranged diametrically opposite to one another. The slots 156 may be openings that are cut out from the outer sleeve 152. Each of the slots 156 is configured to receive one of the tabs 158 of the fingers 154. The fingers 154 may be resilient such that the tabs 158 may bend radially inward when being inserted into the slots 156 and return toward their unstressed configured after being inserted into the slots 156. As illustrated, the length of the slots 156 in a longitudinal direction parallel to the ferrule axis 105 is greater than a dimension of the tabs 158 in the longitudinal direction.

The ferrule holder 116 has a cylindrical stem 122 which extends in an axial direction away from the ferrule 114 toward the inner sleeve 150. The inner sleeve 150 includes a crimp portion 136 at its rearward end 138, which crimp portion 136 is used to make a crimp connection around the optical fiber cable 102. The spring 117 is seated around the stem 122 between a rearward-facing annular shoulder 124 on the outer sleeve 152 and a forward-facing annular surface 152 within a cylindrical recess 154 of the inner sleeve 150. The stem 120 is slidably seated in recess 154 of the inner sleeve 150.

The aforementioned arrangement permits a degree of relative axial movement between the inner sleeve 150 and the outer sleeve 152 and ferrule holder 116. The relative axial movement is limited in one axial direction by engagement of a rearward-facing surface 159 of one or more of the tabs 158 with a forward-facing surface 157 of a rear wall 166 of the respective slot 156 and in the other axial direction by the contact of the outer sleeve 152 with an annular stop ring 165 extending radially outward from the outer surface of the inner sleeve 150.

Figure 8:
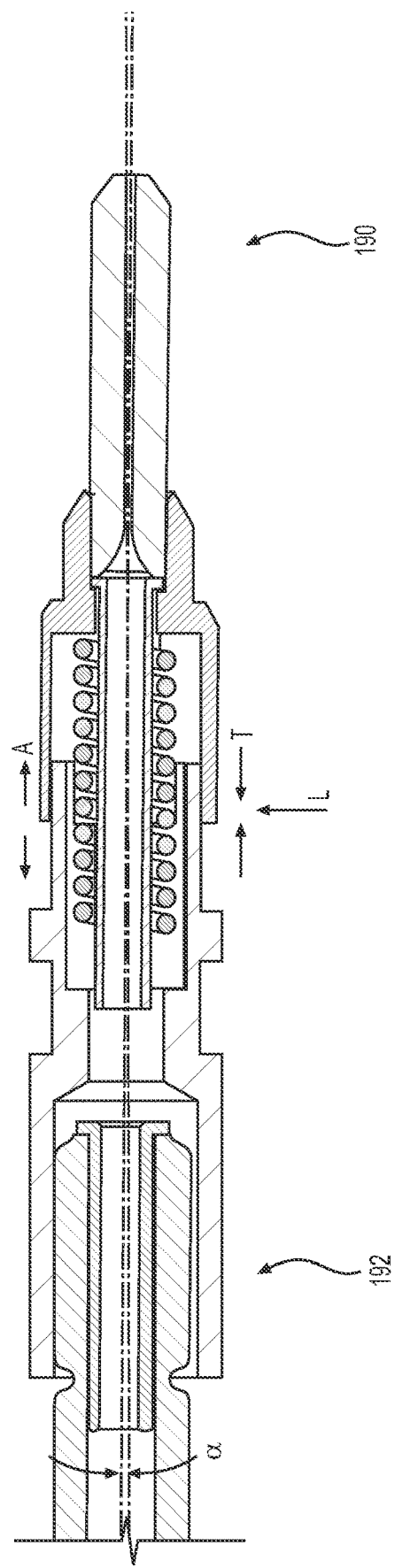
FIG. 8 is a side cross-sectional view of the optical fiber connector sub-assembly of FIG. 5 when articulated.
Figure 9:
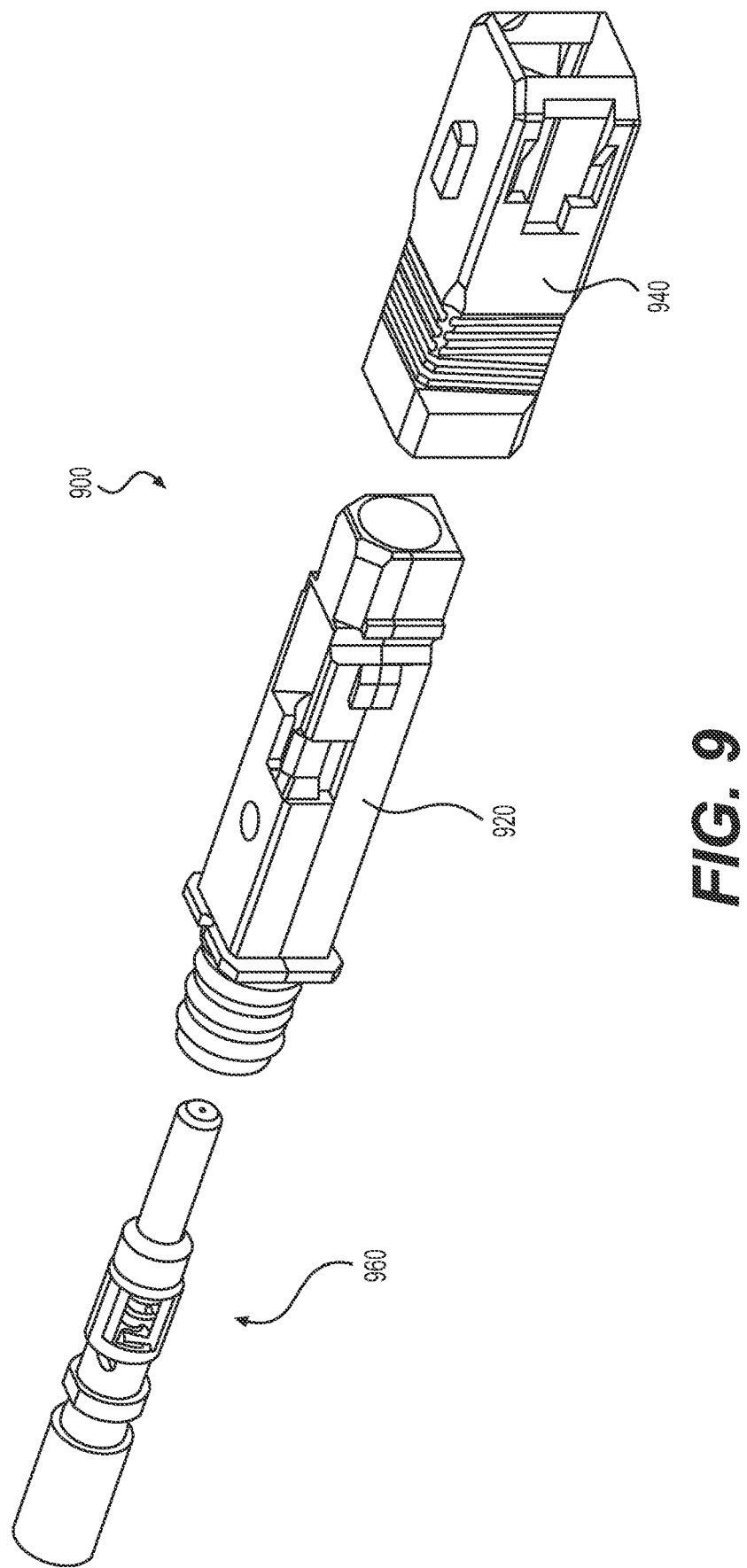
FIG. 9 is an exploded perspective view of an exemplary SC connector in accordance with various aspects of the disclosure.
Figure 10:
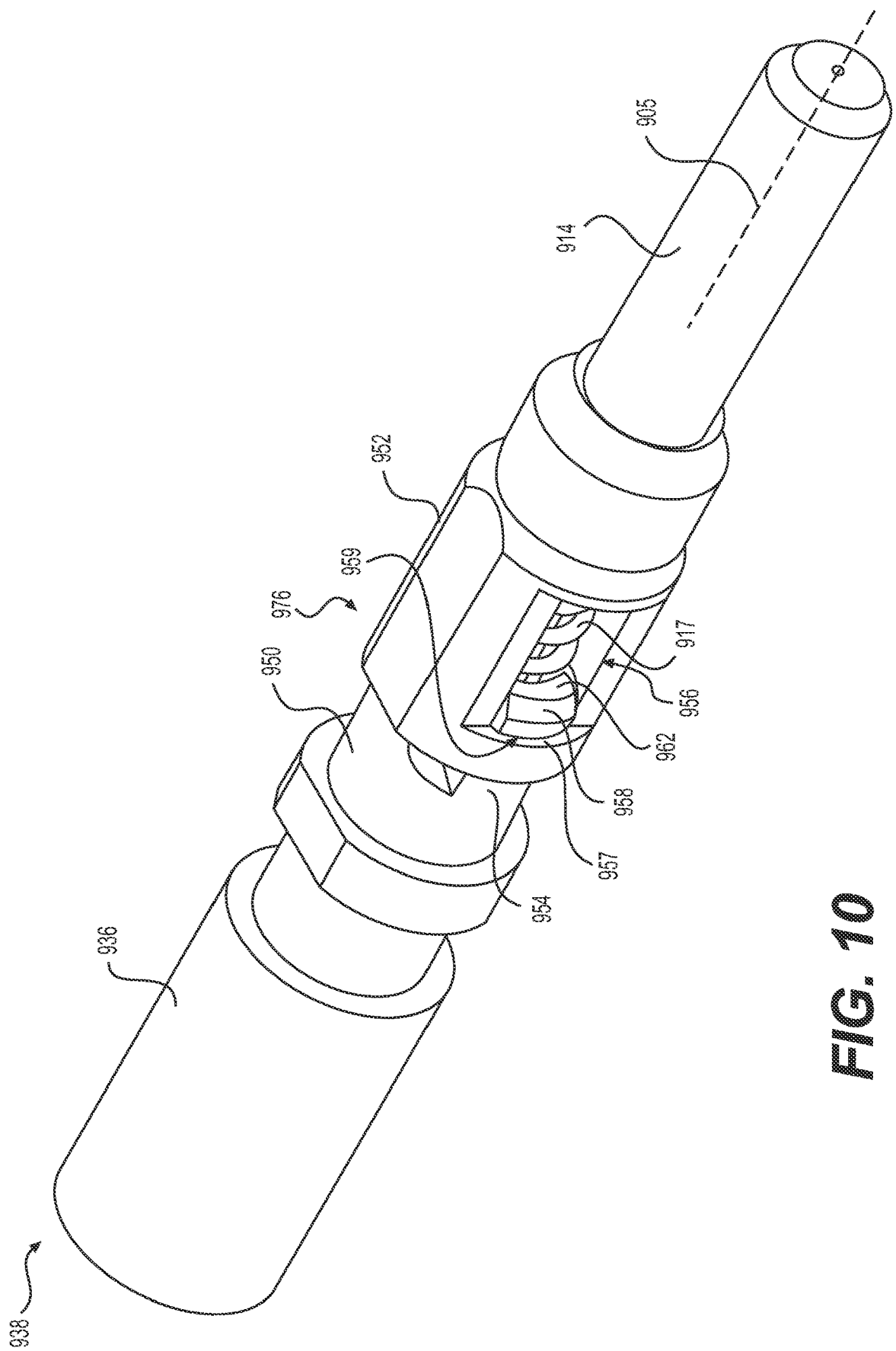
FIG. 10 is a perspective view of the optical fiber connector sub-assembly of the exemplary SC connector of FIG. 9.
Figure 11:
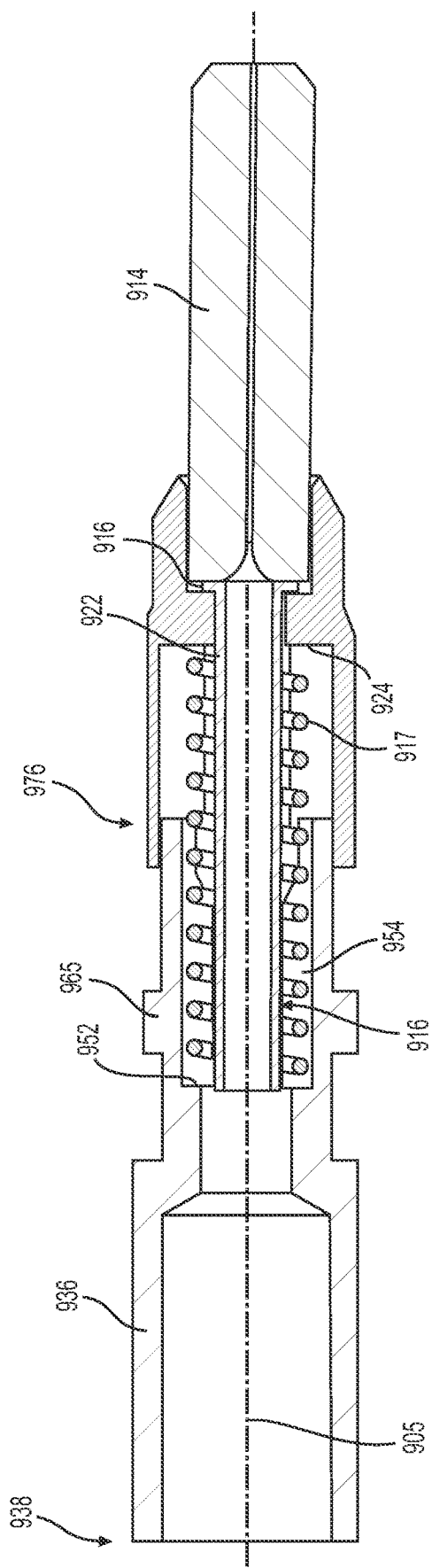
FIG. 11 is an side cross-sectional view of the optical fiber connector sub-assembly of FIG. 10.

The aforementioned arrangement also permits a degree of relative articulation between the inner sleeve 150 and the outer sleeve 152 and ferrule holder 116, as illustrated in FIG. 8. That is, after the tabs 158 are received by the slots 156, the inner sleeve 150 and the outer sleeve 152 and ferrule holder 116 can articulate relative to one another in an X-axis direction and a Y-axis direction that are perpendicular to each other and to the optical fiber axis 105 because the longitudinal dimension of the tabs 158 is less than the longitudinal dimension of the slots 156.

For example, when a load L is applied to the ferrule basket 176 in a direction transverse to the ferrule axis an adjacent to one of the tabs 158, the tab 158 and the forward-facing surface 157 of the respective slot 156 adjacent to the load L will be urged in a direction T toward one another, and the diametrically opposed tab 158 and forward-facing surface 157 of the respective slot 156 will be urged in a direction A away from one another. The load L can thus result in an articulation angle α, as illustrated in FIG. 8. On the other hand, when a load is applied to the ferrule basket 176 at a location between the two tabs 158, the circumferential ends of the tabs 158 that are nearest to the load and their respective forward-facing surfaces 157 will be urged toward one another, and the opposite circumferential ends of the tabs 158 and their respective forward-facing surfaces 157 will be urged away from one another. As a result of this articulation, the two-part ferrule basket 176 isolates a front end 190 of the connector 100 from a rear end 192 of the connector 100 so that the ferrule 114 is isolated from movement due to bending at the rear end 192 of the connector 100. Thus, the connector 100 is capable of transmitting a better signal when weight is applied to the rear end 192 of the connector 101 that causes bending of the rear end 192.

Further, the tabs 158 and the slots 156 are configured such that the inner sleeve 150 and the outer sleeve 152 are rotatably fixed to one another (i.e., are not rotatable relative to one another) when the tabs 158 are inserted into the slots 156. The ferrule basket 176 may also include one or more longitudinal structures (not shown) along the length of its outer surface that are keyed to mating structures (not shown) on an inner surface of the housing 120 to prevent the ferrule basket 176 from rotating relative to the housing 120.

The ferrule holder carrier 150 has a central aperture (not shown) through which the optical fiber 108 and buffering 110 pass, and has in a rear-most portion the crimp portion 136 configured to receive and be crimped to the cable sheathing 112. In some aspects, a strain-relief sleeve (not shown), for example, a boot, may be provided around the junction of the optical fiber cable 102 and the ferrule housing sub-assembly 104. The optical fiber 108 is therefore terminated in the optical fiber connector sub-assembly 160. The resulting optical fiber connector sub-assembly 160 is therefore mechanically whole or integral, both as regards the components forming the sub-assembly and as regards the mechanical connection of the sub-assembly to the optical fiber cable 102.

FIGS. 9-12 illustrate an exemplary SC connector 900 including an optical fiber connector sub-assembly 960 and a conventional inner housing 920 and a conventional outer housing 940 that provides SC-style push/pull engagement/disengagement with a mating optical fiber socket (not shown). The inner housing 920 is connected with the optical fiber connector sub-assembly 960 in a manner known to persons skilled in the art. The SC connector 900 is configured to be coupled with an optical fiber cable 902, which holds an optical fiber 8, for example, a single strand of 125 μm diameter single mode optical fiber, protected by primary and secondary buffering layers 10, about 900 μm in diameter, and an outer sheath 12, typically 3 mm to 5 mm in diameter.

The optical fiber connector sub-assembly 960 includes a cylindrical ceramic ferrule 914, a ferrule holder 916 in which the ferrule 914 is seated, a helical spring 917, and a two-part ferrule basket 976. The optical fiber 908 is terminated by the ferrule in a manner well-known to those skilled in the art, and defines a ferrule axis 905 that extends centrally through the SC connector 900. The ferrule basket 976 includes an inner sleeve 950 and an outer sleeve 952. The inner sleeve 950 and the outer sleeve 952 are coupled to one another and slidable relative to one another along the ferrule axis 905 of the optical fiber connector sub-assembly 960.

Further, the inner sleeve 950 and the outer sleeve 952 are coupled to one another to permit articulation relative to one another, as described hereinbelow. The inner sleeve 950 includes a plurality of fingers 954 formed on the inner sleeve 950 and extending in the longitudinal direction. The fingers 954 are arranged diametrically opposite to one another and are resilient to allow inward and outward flexion in a radial direction relative to the ferrule axis 905. Although the illustrated embodiment includes two fingers 954, it should be appreciated that three or more fingers can be provided. Each of the fingers 954 includes a tab 958 that extends radially outward from a forward end 962 of the respective finger 954.

The outer sleeve 952 includes two slots 956 that are arranged diametrically opposite to one another. The slots 956 may be openings that are cut out from the outer sleeve 952. Each of the slots 956 is configured to receive one of the tabs 958 of the fingers 954. The fingers 954 may be resilient such that the tabs 958 may bend radially inward when being inserted into the slots 956 and return toward their unstressed configured after being inserted into the slots 956. As illustrated, the length of the slots 956 in a longitudinal direction parallel to the ferrule axis 905 is greater than a dimension of the tabs 958 in the longitudinal direction.

The ferrule holder 916 has a cylindrical stem 922 which extends in an axial direction away from the ferrule 914 toward the inner sleeve 950. The inner sleeve 950 includes a crimp portion 936 at its rearward end 938, which crimp portion 936 is used to make a crimp connection around the optical fiber cable 902. The spring 917 is seated around the stem 922 between a rearward-facing annular shoulder 924 on the outer sleeve 952 and a forward-facing annular surface 952 within a cylindrical recess 954 of the inner sleeve 950. The stem 920 is slidably seated in recess 954 of the inner sleeve 950.

The aforementioned arrangement permits a degree of relative axial movement between the inner sleeve 950 and the outer sleeve 952 and ferrule holder 916. The relative axial movement is limited in one axial direction by engagement of a rearward-facing surface 959 of one or more of the tabs 958 with a forward-facing surface 957 of a rear wall 966 of the respective slot 956 and in the other axial direction by the contact of the outer sleeve 952 with an annular stop ring 965 extending radially outward from the outer surface of the inner sleeve 950.

Figure 12:
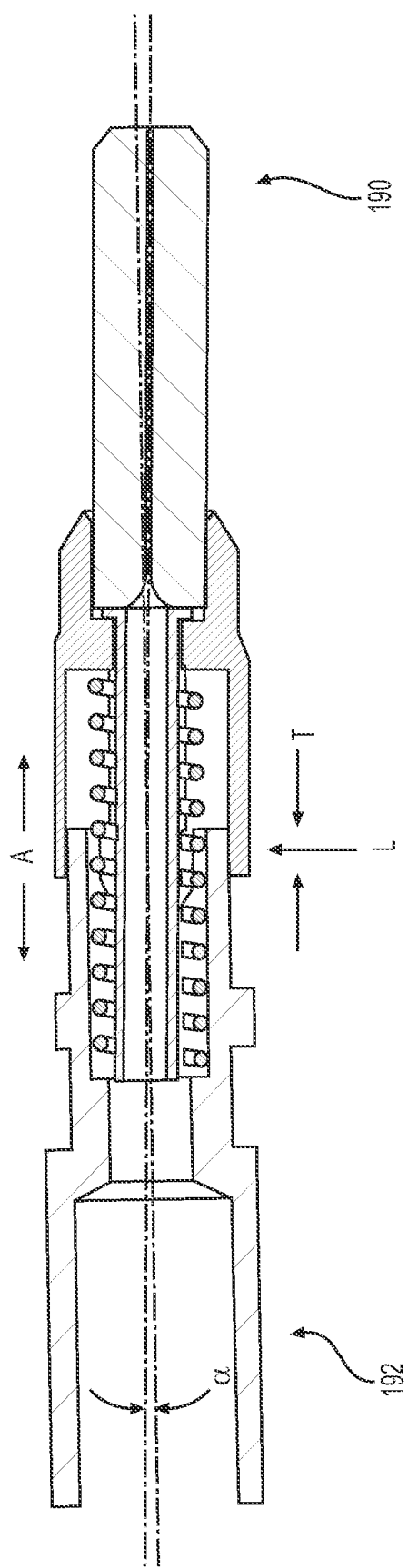
FIG. 12 is a side cross-sectional view of the optical fiber connector sub-assembly of FIG. 10 when articulated.

The aforementioned arrangement also permits a degree of relative articulation between the inner sleeve 950 and the outer sleeve 952 and ferrule holder 916, as illustrated in FIG. 12. That is, after the tabs 958 are received by the slots 956, the inner sleeve 950 and the outer sleeve 952 and ferrule holder 916 can articulate relative to one another in an X-axis direction and a Y-axis direction that are perpendicular to each other and to the optical fiber axis 905 because the longitudinal dimension of the tabs 958 is less than the longitudinal dimension of the slots 956.

For example, when a load L is applied to the ferrule basket 976 in a direction transverse to the ferrule axis an adjacent to one of the tabs 958, the tab 958 and the forward-facing surface 957 of the respective slot 956 adjacent to the load L will be urged in a direction T toward one another, and the diametrically opposed tab 958 and forward-facing surface 957 of the respective slot 956 will be urged in a direction A away from one another. The load L can thus result in an articulation angle α, as illustrated in FIG. 12. On the other hand, when a load is applied to the ferrule basket 976 at a location between the two tabs 958, the circumferential ends of the tabs 958 that are nearest to the load and their respective forward-facing surfaces 957 will be urged toward one another, and the opposite circumferential ends of the tabs 958 and their respective forward-facing surfaces 957 will be urged away from one another. As a result of this articulation, the two-part ferrule basket 976 isolates a front end 990 of the connector 900 from a rear end 992 of the connector 900 so that the ferrule 914 is isolated from movement due to bending at the rear end 992 of the connector 900. Thus, the connector 900 is capable of transmitting a better signal when weight is applied to the rear end 992 of the connector 901 that causes bending of the rear end 992.

Further, the tabs 958 and the slots 956 are configured such that the inner sleeve 950 and the outer sleeve 952 are rotatably fixed to one another (i.e., are not rotatable relative to one another) when the tabs 958 are inserted into the slots 956. The ferrule basket 976 may also include one or more longitudinal structures (not shown) along the length of its outer surface that are keyed to mating structures (not shown) on an inner surface of the inner housing 920 to prevent the ferrule basket 976 from rotating relative to the inner housing 920.

The ferrule holder carrier 950 has a central aperture (not shown) through which the optical fiber 908 and buffering 910 pass, and has in a rear-most portion the crimp portion 936 configured to receive and be crimped to the cable sheathing 912. In some aspects, a strain-relief sleeve (not shown), for example, a boot, may be provided around the junction of the optical fiber cable 902 and the ferrule housing sub-assembly 904. The optical fiber 908 is therefore terminated in the optical fiber connector sub-assembly 960. The resulting optical fiber connector sub-assembly 960 is therefore mechanically whole or integral, both as regards the components forming the sub-assembly and as regards the mechanical connection of the sub-assembly to the optical fiber cable 902.

It should be appreciated that the inner sleeve 150, 950 and the outer sleeve 152, 952 may be constructed of a metal in some preferred embodiments. However, this invention is not intended to be limited to any particular material of the inner sleeve 150, 950 and the outer sleeve 152, 952.

It should be noted that although the specific example described above relate to LC and SC-type connectors, the optical fiber connector sub-assembly can be adapted for use with other types of optical fiber connector systems, for example the ST-type connectors.

The disclosure therefore provides a convenient optical fiber connector and optical fiber communication system and method for providing such a system.

Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. An optical fiber connector sub-assembly for mechanically isolating configured to isolate a front end of an optical fiber connector from a rear end of the optical fiber connector, comprising:
    a ferrule holder configured to hold a ferrule;
    a receiving portion configured to receive the ferrule holder;
    wherein the receiving portion is configured to include an inner receiving portion slidingly coupled relative to an outer receiving portion;
    wherein the ferrule holder and the inner receiving portion are configured to be move relative to each other along a ferrule axis between predefined limits;
    wherein the inner receiving portion is configured to include a cylindrical portion and two engagement structures extending from a forward end of the cylindrical portion;
    wherein the outer receiving portion is configured to include two engagement features extending in an axial direction of the outer receiving portion;
    wherein each of the two engagement features is structurally configured to receive one of the two engagement structures;
    wherein a rearward facing surface of the outer receiving portion and a forward facing surface of the inner receiving portion are structurally configured to receive a biasing member there between;
    wherein the two engagement features and the two engagement structures are configured to rotatingly fix the inner receiving portion relative to the outer receiving portion so as to maintain a predetermined rotational orientation of the ferrule relative to the outer receiving portion; and
    wherein the inner receiving portion and the outer receiving portion are configured to articulate relative to one another so as to prevent a force applied to a rear end of the connector from moving the ferrule relative to another component from a first position; to a second position thereby improving signal transmission of an optical fiber connector.

2. The optical fiber connector sub-assembly of claim 1, wherein the two engagement structures and the two engagement features are disposed symmetrically on the inner receiving portion and the outer receiving portion, respectively.

3. The optical fiber connector sub-assembly of claim 1, wherein the two engagement structures are configured to bend radially inward when being inserted into the two engagement features and to return toward an unstressed configuration after being inserted into the two engagement features.

4. A Subscriber Connection (SC)-type optical fiber connector comprising:
    the optical fiber connector sub-assembly of claim 1;
    an inner housing configured to be fixedly connected to the receiving portion;
    an outer housing;
    wherein the inner housing includes a portion that coaxially extends around a projecting portion of the ferrule to define a receptacle portion for a socket to receive the projecting portion of the ferrule;
    wherein a biasing member is structurally configured to bias the projecting portion of the ferrule along the ferrule axis towards the receptacle portion of the inner housing;
    wherein the inner housing is configured to be engaged within the outer housing; and
    wherein the inner housing and the outer housing are configured to move with respect to each other along the ferrule axis between limits defined by an interaction between the inner housing and the outer housing in order to provide SC-style push/pull engagement/disengagement with a mating optical fiber socket.

5. The SC-type optical fiber connector of claim 4, wherein the ferrule is configured to be rotationally fixed with respect to the ferrule holder about the ferrule axis, and the ferrule holder is configured to be rotationally aligned by means of one or more rotational keys with respect to the outer housing so that the rotational orientation of the ferrule with respect to the outer housing can be set during assembly of the connector at one of one or more predefined rotational orientations.

6. A Lucent Connection (LC)-type optical fiber connector comprising:
    the optical fiber connector sub-assembly of claim 1;
    a housing configured to be fixedly connected to the receiving portion;
    wherein the housing comprises a portion that coaxially extends around a projecting portion of the ferrule to define a receptacle portion for a socket to receive the projecting portion of the ferrule;
    wherein the spring is configured to bias the projecting portion of the ferrule along the ferrule axis towards the receptacle portion of the housing, and
    wherein the housing is configured to provide LC-style engagement/disengagement with a mating optical fiber socket.

7. The LC-type optical fiber connector of claim 6, wherein the ferrule is configured to be rotationally fixed with respect to the ferrule holder about the ferrule axis, and the ferrule holder is configured to be rotationally aligned by means of one or more rotational keys with respect to the housing so that the rotational orientation of the ferrule with respect to the housing can be set during assembly of the connector at one of one or more predefined rotational orientations.

8. An optical fiber connector sub-assembly configured to isolate a front end of an optical fiber connector from a rear end of the optical fiber connector, comprising:
a first receiving portion configured to be slidingly coupled relative to a second receiving portion;
wherein the first receiving portion and the second receiving portion are structurally configured to receive a ferrule holder that is configured to hold a ferrule;
wherein a rearward facing surface of the first receiving portion and a forward facing surface of the second receiving portion are structurally configured to receive a biasing member there between;
wherein the ferrule holder and the second receiving portion are configured to be slidingly move relative to each other between predefined limits;
wherein the first receiving portion includes a first coupling feature configured to receive a second coupling feature extending from a forward end of the second receiving portion;
wherein the first coupling feature and the second coupling feature are configured to rotatingly fix the first receiving portion relative to the second receiving portion so as to maintain a predetermined rotational orientation of the ferrule relative to the second receiving portion; and
wherein the second receiving portion is configured to be coupled relative to the first receiving portion so as to prevent a force applied to a rear end of the connector from moving the ferrule relative to another component from a first position to a second position, thereby improving signal transmission of an optical fiber connector.

9. The optical fiber connector sub-assembly of claim 8, wherein the first coupling feature includes two first coupling features, the second coupling feature includes two second coupling features, and the two first coupling features and the two second coupling features are disposed symmetrically on the first receiving portion relative and the second receiving portion, respectively.

10. The optical fiber connector sub-assembly of claim 8, wherein second coupling feature comprises a finger with a tab and the first coupling feature comprises a slot; and wherein the finger is configured to bend radially inward when the tab is being inserted into the slot and to return toward an unstressed configuration after the tab is received in the slot.

11. A Subscriber Connection (SC)-type optical fiber connector comprising:
the optical fiber connector sub-assembly of claim 8;
an inner housing configured to be fixedly connected to the first receiving portion;
an outer housing;
wherein the inner housing is configured to include a portion that coaxially extends around a projecting portion of the ferrule to define a receptacle portion for a socket to receive the projecting portion of the ferrule;
wherein the biasing member is configured to bias the projecting portion of the ferrule along a ferrule axis towards the receptacle portion of the inner housing;
wherein the first receiving portion is configured to be engaged within the outer housing; and
wherein the inner housing and the outer housing are configured to move with respect to each other along an axis between limits defined by an interaction between the inner housing and the outer housing in order to provide SC-style push/pull engagement/disengagement with a mating optical fiber socket.

12. The SC-type optical fiber connector of claim 11, wherein the ferrule is configured to be rotationally fixed with respect to the ferrule holder about a ferrule axis, and the ferrule holder is configured to be rotationally aligned by means of one or more rotational keys with respect to the outer housing so that the rotational orientation of the ferrule with respect to the outer housing can be set during assembly of the connector at one of one or more predefined rotational orientations.

13. A Lucent Connection (LC)-type optical fiber connector comprising:
the optical fiber connector sub-assembly of claim 8;
a housing configured to be fixedly connected to the first receiving portion;
wherein the housing comprises a portion that coaxially extends around a projecting portion of the ferrule to define a receptacle portion for a socket to receive the projecting portion of the ferrule;
wherein the biasing member is structurally configured to bias the projecting portion of the ferrule along a ferrule axis towards the receptacle portion of the housing; and
wherein the housing is configured to provide LC-style engagement/disengagement with a mating optical fiber socket.

14. The LC-type optical fiber connector of claim 13, wherein the ferrule is configured to be rotationally fixed with respect to the ferrule holder about the ferrule axis, and the ferrule holder is configured to be rotationally aligned by means of one or more rotational keys with respect to the housing so that the rotational orientation of the ferrule with respect to the housing can be set during assembly of the connector at one of one or more predefined rotational orientations.

15. An optical fiber connector sub-assembly for isolating-configured to isolate a front end of an optical fiber connector from a rear end of the optical fiber connector, comprising:
a first receiving portion configured to be slidingly coupled relative to a second receiving portion;
wherein the first receiving portion and the second receiving portion are structurally configured to receive a ferrule holder that is configured to hold a ferrule;
wherein a rearward facing surface of the first receiving portion and a forward facing surface of the second receiving portion are configured to receive a biasing member there between; and
wherein the second receiving portion is configured to be coupled relative to the first receiving portion so as to prevent a force applied to a rear end of the connector from moving the ferrule relative to another component from a first position to a second position, thereby improving signal transmission of an of fiber connector.

16. The optical fiber connector sub-assembly of claim 15, further comprising a biasing member between the rearward facing surface of the first receiving portion and the forward facing surface of the second receiving portion.

17. The optical fiber connector sub-assembly of claim 15, wherein the first receiving portion includes a first coupling feature configured to receive a second coupling feature extending from a forward end of the second receiving portion; and wherein the first coupling feature and the second coupling feature are configured to rotatingly fix the first receiving portion relative to the second receiving portion.

18. The optical fiber connector sub-assembly of claim 17, wherein the first coupling feature includes two first coupling features, the second coupling feature includes two second coupling features, and the two first coupling features and the two second coupling features are disposed symmetrically on the first receiving portion relative and the second receiving portion, respectively.

19. The optical fiber connector sub-assembly of claim 17, wherein the second coupling feature comprises a finger with a tab and the first coupling feature comprises a slot; and wherein the finger is configured to bend radially inward when the tab is being inserted into the slot and to return toward an unstressed configuration after the tab is received in the slot.

20. A Subscriber Connection (SC)-type optical fiber connector comprising:
  the optical fiber connector sub-assembly of claim 15;
  an inner housing configured to be fixedly connected to the first receiving portion;
  an outer housing;
  wherein the inner housing is configured to include a portion that coaxially extends around a projecting portion of the ferrule to define a receptacle portion for a socket to receive the projecting portion of the ferrule;
  wherein a biasing member is structurally configured to bias the projecting portion of the ferrule along a ferrule axis towards the receptacle portion of the inner housing;
  wherein the first receiving portion is configured to be engaged within the outer housing; and
  wherein the inner housing and the outer housing are structurally configured to move with respect to each other along an axis between limits defined by an interaction between the inner housing and the outer housing in order to provide SC-style push/pull engagement/disengagement with a mating optical fiber socket.

21. The SC-type optical fiber connector of claim 20, wherein the ferrule is configured to be rotationally fixed with respect to the ferrule holder about a ferrule axis, and the ferrule holder is configured to be rotationally aligned by means of one or more rotational keys with respect to the outer housing so that the rotational orientation of the ferrule with respect to the outer housing can be set during assembly of the connector at one of one or more predefined rotational orientations.

22. A Lucent Connection (LC)-type optical fiber connector comprising:
  the optical fiber connector sub-assembly of claim 15;
  a housing configured to be fixedly connected to the first receiving portion;
  wherein the housing comprises a portion that coaxially extends around a projecting portion of the ferrule to define a receptacle portion for a socket to receive the projecting portion of the ferrule;
  wherein the biasing member is structurally configured to bias the projecting portion of the ferrule along a ferrule axis towards the receptacle portion of the housing; and
  wherein the housing is configured to provide LC-style engagement/disengagement with a mating optical fiber socket.

23. The LC-type optical fiber connector of claim 22, wherein the ferrule is configured to be rotationally fixed with respect to the ferrule holder about the ferrule axis, and the ferrule holder is configured to be rotationally aligned by means of one or more rotational keys with respect to the housing so that the rotational orientation of the ferrule with respect to the housing can be set during assembly of the connector at one of one or more predefined rotational orientations.

* * * * *